United States Patent [19]

Chan et al.

[11] Patent Number: 5,316,790
[45] Date of Patent: May 31, 1994

[54] TUNGSTEN DISULFIDE MODIFIED EPOXY

[75] Inventors: Jimmy C. Chan, Granger; Betty H. Kocsis, South Bend, both of Ind.

[73] Assignee: Allied-Signal Inc., Morristown, N.J.

[21] Appl. No.: 14,297

[22] Filed: Feb. 5, 1993

[51] Int. Cl.$^5$ .............................................. B32B 15/08
[52] U.S. Cl. .................................... 427/142; 427/386
[58] Field of Search ................................ 427/386, 142

[56] References Cited

U.S. PATENT DOCUMENTS

| | | | |
|---|---|---|---|
| 3,650,004 | 3/1972 | Bergstrom | 29/402.18 |
| 3,950,571 | 4/1976 | McBride et al. | 427/142 |
| 4,556,498 | 12/1985 | Carbo et al. | 427/327 |
| 4,701,382 | 10/1987 | Pichant | 427/385.5 |
| 4,996,085 | 2/1991 | Sievers | 427/142 |
| 5,141,656 | 8/1992 | Rountree | 427/290 |

OTHER PUBLICATIONS

A Wear Equation for Epoxy Bonded MoS$_2$ Solid Lubricant Coating, Wear Materials, 3rd Edition, 1981, pp. 644–647, Hu et al.
Low Temperature Cure Adhesive for Honeycomb Repair Applications, 23rd International Sampe Tech. Conf., 1991, pp. 1072–1082, Mehrkam et al.
Evaluation of Various Non-Asbestos Epoxy Adhesives for Aircraft Repair, 21st. Inter. Sampe Tech. Conf., 1989, pp. 7–20, Brescia et al.
Development of a Room Temperature Storage, Room Temperature Curing Paste Adhesive with High Temperature Capability and Toughness, 33rd, Int. Sampe Symp., 1988, pp. 1355–1366, Mizusawa et al.
Repair Adhesives: Development Criteria for Field Level Conditions, 34th International Sampe Symposium, 1989, pp. 1052–1066, Cichon.

*Primary Examiner*—Shrive Beck
*Assistant Examiner*—Erma Cameron
*Attorney, Agent, or Firm*—Leo H. McCormick, Jr.; Larry J. Palguta; Robert A. Walsh

[57] ABSTRACT

A method of restoring a damaged surface of a substrate to a functional condition through a filler material consisting essentially of tungsten disulfide epoxy resin having a 10:1 ratio. The filler material is cured after being applied to the damaged surface by uniformly raising the temperature to a cure temperature of the epoxy to allow any volatiles to evaporate without the creation of voids in the surface such that the resulting porosity prevents corrosion of the substrate when exposed to aromatic fuels at temperatures of 350 degrees F.

4 Claims, 2 Drawing Sheets

TUNGSTEN DISULFIDE MODIFIED EPOXY

This invention relates to a lubricative coating and filler material for restoring metal surfaces that have been scratched, scored, grooved or otherwise damaged to a functional condition to avoid costly repair procedures and minimizing scrap for metal components.

In the past, when surfaces on metal components were damaged, it was common practice to repair scratches in worn areas by welding or brazing, then remachining to restore surfaces to a functional condition.

Even though this type of repair was time consuming and expensive, it was more cost effective than scrapping the metal component. In an attempt to reduce cost, it was suggested that such damaged areas may be repairable through the use of a high performance epoxy material. However, it was not until molybdenum disulfide was added to the epoxy, as disclosed by the method and material in U.S. Pat. No. 3,950,571, that damaged surfaces could be restored practically and economically and especially those metal components that may be exposed to aviation fuel at temperatures above 350 degrees F.

While the molybdenum disulfide modified epoxy repairs are satisfactory for most applications it has been observed that voids may be present in the material applied to repair the damaged surfaces. In order to achieve a smooth and void free surface through the use of molybdenum disulfide epoxy, two or three applications are required in order to obtain a nonporous surface and machining is required after each application. Investigation revealed that a major cause of the voids and the resulting porosity in a repaired surface is caused by the evaporation during the curing process of solvents used as a carrier for the modified epoxy mixture. The development of voids and a porous surface should be avoided or minimized in order to achieve maximum structural integrity, better wear resistance and to minimize potential leakage problems through the repaired surface.

Upon reviewing the current problems, it was determined that a repair material should exhibit or possess the following properties or characteristics: a low coefficient of friction; minimum porosity; and good resistance to aviation fuel at temperatures above 350 degrees F. Further, when used to repair surfaces such materials should be nonporous, lubricate a surface and provide a machinable coating in a single application to reduce the time involved in making or restoring a surface to a functional condition.

Even though some high temperature triazine resins such as disclosed in U.S. Pat. No. 4,831,068 were known, because of the availability, an epoxy resin under the current tradename of Hysol 929NA sold by Dexter Hysol Corporation was selected for use in a research to overcome the problems encountered through the use of the known filler materials. This epoxy resin is essentially a glycidyl polyether of bisphenol A containing an amine curing agent and was is known to be a good corrosion barrier on various metallic substrates by virtue of its ability to insulate the metallic substrate from the environment.

A literature search of materials acceptable for use as a high temperature lubricant filler indicated that tungsten disulfide may be an acceptable alternative for molybdenum since tungsten disulfide has a measured coefficient of friction of 0.03 versus 0.06 for molybdenum disulfide. Thus, a significant reduction in the resulting coefficient of friction could be realized using the same amount of tungsten disulfide. Furthermore, tungsten disulfide is more chemically resistant to the aerospace environment such as exposure to high temperature aviation fuel.

An initial filler material utilizing tungsten disulfide, the epoxy resin and a solvent was prepared and applied to a surface on a metallic surface to effect an overlap shear test in accordance with ASTM D1002. This test indicated that a bond of between 1200-2090 psi could be achieved, however, on examination voids were present in the filler material. Through investigation and experimentation it was found that voids in the filler material could be minimized by the elimination of solvents.

Thereafter, epoxy filler material consisting of a mixture of epoxy and tungsten disulfide having a ratio of 10:1 was compounded and applied to a metal substrate. The filler material was thereafter cured and tested in accordance with ASTM D1002 to determine shear strength. The test indicated a bond strength of between 1400-2080 psi but more importantly there were substantially no voids present in the cured filler material. During the cure of this material the process was modified to include a ramp step in the cure cycle through which the cure temperature was uniformly increased to further reduce the formation of porosity or voids due to the evaporation of solvent from the mixture.

It is an object of this invention to provide a filler material for repairing damaged surfaces to substantially their original strength when exposed to aromatic fuels having a temperatures of 350 degree F.

It is another object of this invention to provide a filler material with substantially no voids when cured on a substrate to restore a surface on the substrate to a functional condition.

It is a further object of this invention to provide a filler material which can be used to restore up to 0.006 inches of a surface to a functional condition in a single application.

It is still further object of this invention to provide a process of restoring a surface to a functional condition without the creation of voids in a filler material.

BRIEF DESCRIPTION OF THE DRAWINGS

These objects and certain other advantages should be apparent from reading this specification while viewing the drawings wherein.

DETAILED DESCRIPTION OF THE INVENTION

In our research for a restoration material, a modified epoxy filler was compounded to produce a mixture of epoxy resin (Hysol 929NA), tungsten disulfide and isopropyl alcohol (IPA) in the ratio of 9:1:1.6 by weight. The average particle size of the tungsten disulfide was 1.2 microns and had a silver-gray appearance. The resulting mixture, which was blended manually to a uniform consistency since high viscosity precluded blending by mechanical means, had a uniform dark greenish-gray color. Overlap shear tensile strips were fabricated and tested per ASTM D1002 using the modified or filled epoxy on 2024-T3 aluminum strips which had been sulfuric acid anodized and dichromate sealed per MIL-A-8625 Type II Class 2. All surfaces were degreased with methyl ethyl ketone (MEK) immediately prior to application of mixture.

Test strips were cured at 300 degrees F. for 90 minutes. Results yielded a relatively low average overlap shear strength of 1220 psi. Examination revealed a large amount of surface porosity. This was attributed to evaporation of the IPA during the curing process. Tests were repeated with an additional step in the cure cycle of a one hour ramp rate from room temperature to 300 degrees F. followed by 90 minutes at 300 degrees F. Average overlap shear strength for these strips was improved to 1640 psi or approximately 36% when the ramp step was utilized. Examination of these test strips revealed that although porosity had been reduced, a significant amount of porosity was still present.

Figure 1:
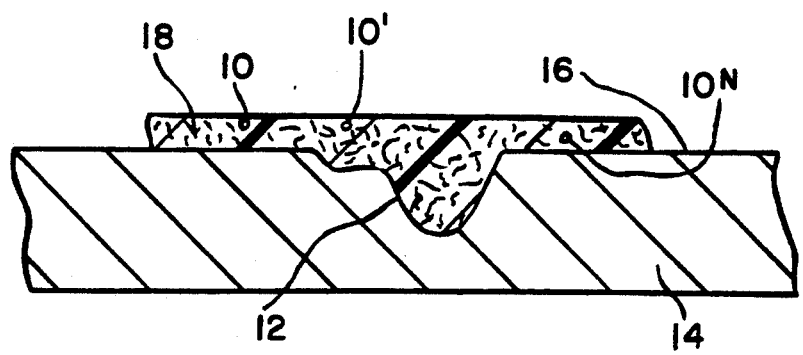
FIG. 1 is an illustration of a substrate having a filler applied thereto to restore a surface to an operational condition.

FIG. 1 illustrates a cross section of an aluminum strip 14 having a surface 16 with a surface defect 12 which was filled with the tungsten disulfide modified epoxy mixture 18 with a plurality of voids 10, 10' . . . $10^n$ therein. From investigation it was determined that the voids 10,10' . . . $10^n$ and resulting porosity in the restoration material is primarily the result of evaporation of the solvent IPA during the curing of the modified epoxy mixture.

Figure 2:
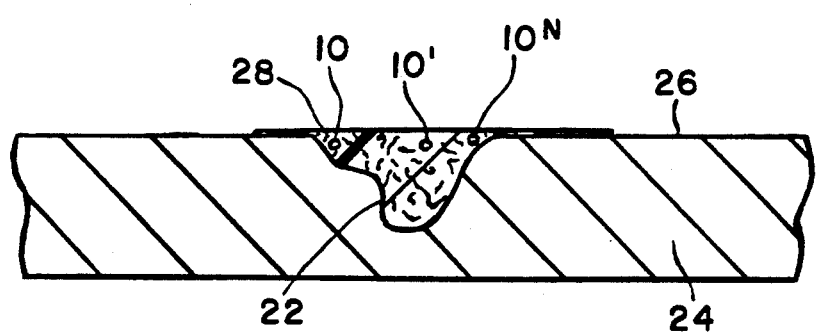
FIG. 2 is an illustration of a substrate having a filler material applied to restore a surface to an operational condition in accordance with the principals of this invention.

In order to reduce the amount of porosity in the restorated area on surface 16, it was determined that the modified epoxy mixture 18 must be solvent-free. In addition because of the low coefficient of friction of tungsten disulfide it was determined that the ratio of tungsten disulfide in a mixture could be reduced and still perform in an adequate manner in the restoration of a surface defect or damaged area 12. Thereafter, modified epoxy mixture 28 was made with a 10:1 ratio by weight of epoxy resin (Hysol 929NA) and tungsten disulfide. No IPA was added at any time during the mixing even though additional care was required to assure that a uniform consistency was obtained. Samples and tests were repeated per ASTM D1002 utilizing a two hour ramp rate from room temperature to 300 degrees F. followed by 90 minutes at 300 degrees F. Test results from these samples indicated an average overlap shear strength of 1710 psi was produced through the use of this modified epoxy mixture or resin filler material 28. On examination of the aluminum strip 24 used in these tests and as illustrated in FIG. 2, substantially no voids (approximately a 90% reduction from the modified epxoy mixture 18) were found in the cured modified epoxy mixture 28 used as a filler material for a defect 22 in surface 26 and as a result it can be asserted that this tungsten disulfide modified epoxy and the method of curing the same reduces the resulting porosity in the cured modified epoxy mixture 28 used as a restoration material.

To further substantiate the reliability and strength and obtain information relating to other characteristics of modified epoxy mixture 28 having a 10:1 ratio of epoxy to tungsten disulfide mixed without a solvent and cured with a ramp cycle to uniformly bring the epoxy to a cure temperature to obtain a high strength and nonporous restoration material. Thereafter, additional tests were performed on various aluminum components.

Materials that are resistant to high aromatic content fuels at elevated temperatures are of a primary concern in aerospace applications. Therefore, tests were conducted with respect to the tungsten disulfide modified epoxy mixture 28 wherein samples made according to ASTM D1002 were aged in ASTM Fuel B for 72 hours at 350 degrees F. Overlap shear tests for these samples yielded an average shear strength of 1990 psi. These tests indicated that exposure to ASTM Fuel B, which contains 30% aromatic, did not adversely affect the overlap shear strength of the tungsten disulfide modified epoxy mixture 28 and would provide exceptional protection for a metallic substrate at 350 degrees F. in jet fuels and other hydrocarbons with or without aromatic.

Figure 3:
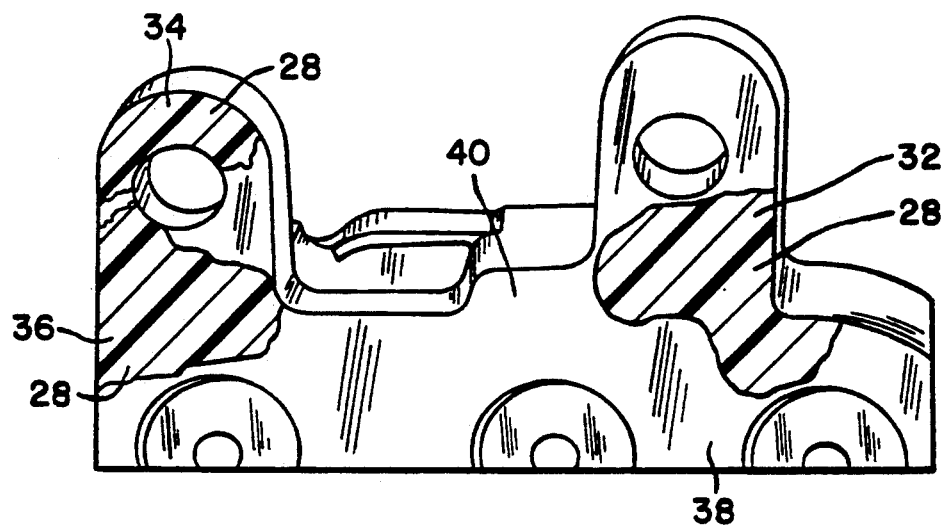
FIG. 3 is a illustration of a metallic member having a surface with a plurality of damaged areas some of which have a filler material made according to the teaching herein applied thereto.
Figure 4:
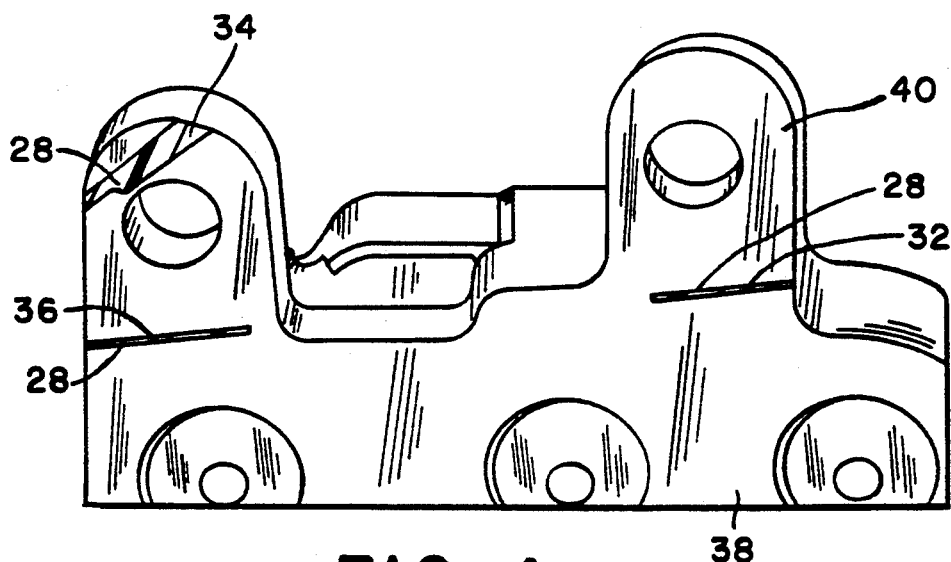
FIG. 4 is a illustration of the metallic member of FIG. 3 with the damaged area in a restored.

Thereafter, the modified epoxy mixture 28, made of tungsten disulfide and epoxy resin in the 1:10 ratio, was applied to areas 32, 34 and 36 of a hard anodized aluminum casting 38 that had been damaged, as shown in FIG. 3. Thereafter, the casting 38 was placed in an oven and the temperature uniformly raised to 300 degrees F. in a time period of one hour and maintained at the 300 degree F. temperature for a time period of ninety minutes. The excess epoxy mixture 28 was then machined to the original dimensions of the surface 40 of casting 38 as shown in FIG. 4. No difficulties were encountered during the machining process to remove excessive cured modified epoxy mixture 28 from casting 38 nor during machining did the epoxy mixture 28 delaminate as the damaged area was being sized to an restored condition. Visual inspection of the restored surface indicate that the damaged areas 32, 34 and 36 were successfully repaired with a negligible surface porosity of less that one percent of the surface area.

To better understand the tungsten disulfide modified epoxy mixture 28 and how thick a coating could be applied in a single application, multiple layers in thicknesses of approximately 0.006" inches per layer were applied to a metal substrate and cured using the ramp step of uniformly raising the temperature to the cure temperature. After curing, the substrate was machining to a final specification. No difficulties were encountered during the machining process, no delamination occurred between the substrate/epoxy or the epoxy/epoxy interfaces. This test indicates that the tungsten disulfide modified epoxy mixture 28 could be applied to restore a surface on a metal substrate in single or multiple layers.

We claim:

1. A method of restoring a damaged surface on a metal substrate to return the damaged surface to a functional condition, said method comprising the steps of:

mixing a filler material consisting essentially of epoxy resin and tungsten disulfide having a ratio of 10:1;

applying a quantity of filler material on said damaged surface;

uniformly raising the temperature of said metal substrate over a time period of at least sixty minutes to a cure temperature of at least 300 degrees F. for said epoxy resin to allow any volatiles in said filler material to be released without effecting the porosity thereof;

maintaining the temperature of said epoxy resin at the cure temperature of at least ninety minutes to fully cure the resin and develop a solid filler without any significant porosity that could allow deterioration of the metal substrate and having a coefficient of friction of 0.03; and machining any excess cured epoxy from said damaged surface to establish said functional surface.

2. The method as recited in claim 1 wherein said cure of filler material results in a bond strength between said filler material and metal substrate greater that 1700 psi.

3. The method as recited in claim 1 wherein said curing of said filler material occurs only after uniformly raising the temperature of the substrate and results in a substantially solid filler without voids in the surface to provide corrosion protection for the underlying metal substrate.

4. The method as recited in claim 3 wherein further including the application of a second layer of filler material over the damaged surface after the machining and a further step of machining to define up to 0.006 inches of filler material per layer over said damaged surface.

* * * * *